Patented Feb. 2, 1954

2,668,143

UNITED STATES PATENT OFFICE 2,668,143

GLASS ELECTRODE

Paul T. Gilbert, Jr., Alhambra, and Edwin P. Arthur, Altadena, Calif., assignors to Beckman Instruments, Inc., a corporation of California No Drawing. Application January 19, 1950, Serial No. 139,545

7 Claims. (Cl. 204—195)

Our invention relates to glass electrodes for pH measurement and more particularly to glass electrodes having pH-sensitive membranes of lithia glass.

As disclosed in the patent to Cary et al., No. 2,462,843, lithia glass electrodes have outstanding advantages over the previously-used electrodes having membranes of sodium glass, such as Corning 015, particularly in reduction of sodium ion errors. The use of lithia glass, in accord with the disclosure of Cary et al. supra, has made possible the accurate measurement of pH in a range up to 13 or 14 pH units, even in solutions as strong as 2-N NaOH or stronger.

Lithia silica glasses are improved by the addition of other oxides, as taught by Cary et al.; but we have found novel utility in the combined use of oxides of the two rare earth metals, La and Ce, often in fairly equal weight proportions, each being present to the extent of a few to 27 atoms per 100 atoms of Si, the total of La and Ce being typically from about 3 to 30 atoms per 100 atoms of Si.

It is an object of the invention to provide a lithia-silica glass containing both La and Ce.

The composition of the glasses of the invention, these being exclusively oxide glasses, can best and most accurately be expressed in terms of atoms of the metallic components per 100 atoms of Si. On this basis, the preferred glasses of the present invention are of the following compositions: Li, 50–120 atoms/100 atoms of Si. Total alkaline earth metals, typically Ca, Sr, and/or Ba, 0–20 atoms/100 atoms of Si. La and Ce, totalling from a few to 30 atoms/100 atoms of Si, the atomic ratio of these two rare earth metals in either order being a maximum of 10. Additionally Cs can be incorporated to substitute for a portion of the Li, the Cs being present in the amount 0–20 atoms/100 atoms of Si, the total number of atoms of Cs and Li/100 atoms of Si not exceeding 120 atoms/100 atoms of Si. It is an object of the invention to provide litha-silica glasses within such compositional ranges.

Such glasses of the invention possess unexpected chemical durability in certain hot corrosive media, as evidenced by unexpected constancy and uniformity of response to variations in pH, as compared with a corresponding glass in which the mixture of La and Ce is replaced by an equivalent content of La. Such glasses are, in general, also superior to the corresponding glasses containing Ce alone as the rare earth component, not only in possessing lower sodium ion errors but in being far easier to fabricate. Furthermore, a glass of optimal composition comprising Li, Ba, La, Ce, and Si oxides excels an optimal glass comprising Li, Ca and Ba, La, Cs and Si oxides in retaining its usefulness while being boiled in strong alkali. The latter glass, under these conditions, although capable or rejuvenation, completely loses its hydrogen function after several hours' boiling in 4 per cent sodium hydroxide and is not useful for continuous operation in hot alkalies, e. g. for control purposes. We have, further, not found a glass comprising Li, Ba, La, and Si which compares in durability with the best such glasses containing either Ce or Cs. Optimal glasses of the former composition (Li, Ba, La, and Si) develop extreme electrostatic sensitivity if kept in hot strong acids. Another advantage of the glasses containing both La and Ce is that a fresh or new electrode made therefrom can be put into use without preliminary treatment. It will perform excellently, but with a sodium ion error usually somewhat greater than that exhibited after suitable soaking, whereas La-Cs glasses of high durability require acid soaking to develop full and rapid pH response.

The components of the glasses of the invention, preferably of CP grade, are mixed and heated in a platinum crucible to form the glass melt. From this melt, electrode bulbs can be directly blown by the process disclosed in the patent to Cary et al. No. 2,346,470, or other processes known in the art.

Each of the mixed constituents may be in the carbonate, nitrate, oxide or hydroxide form, the only requirement being that it will yield the appropriate oxide upon fusion. Because lithium oxide ($Li_2O$) is difficult to obtain and handle, lithium carbonate ($Li_2CO_3$) is preferred as the starting material. Although barium oxide (BaO) is not so troublesome as $Li_2O$, again the carbonate is the more convenient to use. As for La, either the oxide ($La_2O_3$) or the carbonate ($La_2(CO_3)_3$) may be used but both compounds are affected by uncertainty of composition and should be analyzed prior to use. Cerium, on the other hand, is most conveniently incorporated in the form of its dioxide ($CeO_2$), some of the oxide possibly tending to change to a lower oxide when fused but much of the higher oxide persisting in the finished glass as indicated by the usually rather strong amber color thereof (a feature desirable from the standpoint of electrode identification and here obtainable without the necessity of adding a separate coloring agent). Cesium, we have found, is most easily handled in the form of nitrate ($CsNO_3$).

Considering numerous factors, the best glasses of the invention are those which contain La and Ce in approximately equal atomic amounts. However, the glasses of the invention possess unexpectedly utility even if the atomic ratio of La and Ce is up to 10.

As an example of one of the preferred glasses of the invention, the pre-fusion mixture may have the following composition in proportions by weight: $Li_2CO_3$, about 181 parts; $BaCO_3$, about 138 parts; $La_2O_3$, about 81 parts; $CeO_2$, about 77 parts; $SiO_2$, about 369 parts. In heating, a portion of the ceric oxide dissolves with ease but only by long-continued heating at temperatures near 2500° F. can the remaining portion be dissolved and then with evolution of gas from the melt. In the preferred practice, we do not drive all of the gas from the melt but carry the melting only to a point where on cooling to working temperature the magma appears substantially homogeneous.

It has been found, in a series of careful and exact comparisons under precisely controlled conditions, that the properties of an optimal electrode glass comprising lithia, baryta, lanthana, ceria (the dioxide) and silica, cannot in general be found by averaging the corresponding properties of the two electrode glasses which are exactly analogous in composition, except that one comprises only La as the rare earth constituent, and the other only Ce. The glasses described below will be designated as glass I, containing La but no Ce; glass II, being the glass described in the preceding paragraph containing approximately equal atomic amounts of La and Ce, the total number of atoms of La and Ce, per atom of Si, being equal to the number of atoms of La in glass I, per atom of Si, and the contents of Li and Ba, with respect to Si, being the same in both; and glass III, containing Ce (added as $CeO_2$) but no La, the composition being identical to that of glass I except that each atom of La in glass I is replaced by one atom of Ce in glass III. Specifically, glasses I, II and III were of the following composition in atoms/100 atoms of Si:

|     | Glass I | Glass II | Glass III |
| --- | --- | --- | --- |
| Li | 80 | 80 | 80 |
| Ba | 11.4 | 11.4 | 11.4 |
| La | 15.4 | 8.1 | 0 |
| Ce | 0 | 7.3 | 15.4 |

Glasses I, II, and III were prepared in exactly similar fashion, by melting suitable mixtures of $Li_2CO_3$, $BaCO_3$, $La_2CO_3$, $CeO_2$ and $SiO_2$, and blowing therefrom electrode bulbs of uniform size and shape, the blowing of each of the bulbs being by the same technique and involving touching the end of the stem glass to the melt to pick up a gob of the melt which is then blown to shape. Sets of electrodes of each of the three glasses, selected for comparative evaluation of their properties, were matched with respect to electric resistance and subjected to exactly similar and simultaneous treatment.

It was found that glass III, when its total alkaline earth content was equal to that in the composition of glass II (in which the total alkaline earth content was selected to yield substantially maximal chemical durability in hot corrosive media, compatible with usefully low electrical resistance and advantageously low sodium ion error), is impractical of commercial manufacture. Whereas glasses I and II are readily made into electrodes, it is extremely difficult to prepare bulbs of glass III entirely clear and free from devitrified areas and macroscopic crystals. These crystals form very swiftly during the process of blowing, and it is very difficult to avoid nucleating them. Furthermore, the glass III is physically more difficult to blow into satisfactory bulbs than glasses I and II. Moreover, a higher furnace temperature is needed to keep the cerium in solution—a temperature so high that in small crucible melts, a noticeable loss of lithia may occur, also with diminished stability of the ceric state of the cerium, oxygen being more readily evolved at such higher temperatures. With glass II, which can be readily melted and blown into bulbs, it is probable that the ceria is present very largely in the ceric state of oxidation, where in glass III this is much less probable and the chemical composition of the bulbs cannot be controlled so nicely, due to this circumstance as well as the possible loss of lithia and the appearance of crystals. However, by careful manipulation and despite such difficulties, a sufficient number of electrodes of glass III, suitable for test, were made up.

The tests, to which the electrodes were subjected, involved immersion in various media (sulphuric acid, hydrochloric acid, water, sodium hydroxide, and tetramethyl-ammonium hydroxide) at temperatures of about 100° C., for periods of a day to a week, followed by evaluation of the electrodes at room temperature with an accurate pH meter and by the use of three buffers, namely, 1-N $H_2SO_4$, 1-N NaOH, and a standard pH 7 buffer, to which reference is made in the numbered paragraphs hereinafter and into which the electrodes were immersed sequentially and tested for accuracy of response. Such 1-N $H_2SO_4$ and 1-N NaOH solutions will be referred to herein as buffers inasmuch as their resistance to pH change on adding an acid or alkali is very high as compared to ordinary unbuffered solutions near neutrality, e. g., pure water.

In order to obtain an objective and quantitative rating or score by which to compare glass electrodes, a system was evolved according to which the following quantities were added together:

(1) The average absolute buffer shock, or change of apparent asymmetry potential during immersion in a buffer, as measured by the equilibrium potentials in a different buffer before and after immersion, and taken in units of 0.5 mv.

(2) The net total asymmetry potential change during a set of tests, taken in units of 1 mv.

(3) The "dormicity" or departure from theoretical pH response on immersion in the first buffer of a pH different from that in which the electrode has been boiled, and taken in units of 1 mv. for the range 0–7 pH or in units of 5 mv. for the range 7–14 pH (1-N NaOH was used at the high pH end).

(4) The average acid error, or departure from theoretical pH response in 1-N $H_2SO_4$, taken in units of 0.5 mv.

(5) The average alkaline error, in 1-N NaOH, in units of 5 mv.

(6) The immersion shock, or the coefficient A of the exponential term of the equation, $$emf = f + A \cdot 2^{-t/T}$$

best fitting the potential curve observed after immersing the electrode in a buffer. In this equation, $f$ is the equilibrium potential, $t$ is the time following immersion, and $T$ is the half-time (analogous to the radioactive half-life), $t$ and $T$ being in the the same units. This factor A is taken in units of 5 mv.

(7) The "sluggishness" or half-time of equilibration (T in the above equation), taken in units of 0.2 min.

(8) The average potential drift following immersion in acid and neutral buffers, measured between $t=1$ min. and equilibrium, i. e., the quantity $A \cdot 2^{-1/T}$, taken in units of 1 mv.

(9) The average potential drift, as above, measured in 1-N NaOH, and taken in units of 2 mv.

The sum of the above quantities is a measure of the poorness of an electrode. The reciprocal of such sum, multiplied by 1000, can be taken as a measure of the general usefulness of an electrode and may be termed a "utility number."

A study of the "utility numbers" of glasses I, II, and III reveals that glass II (containing both La and Ce) remains useful under all conditions which can be endured by glass I or glass III. It also remains useful under certain conditions which destroy the value of glass I, and under certain other conditions its advantage over glass III is equally remarkable. To be exact, under identical conditions, glass II may be three times as good as glass I (measured on the basis of "utility number"), and under other conditions, as many as four times as good as glass III.

These ratios represent usefulness as viewed from the standpoint of an average user of glass electrodes, all aspects of the matter receiving what we believe to be approximately equal weight.

Additionally, glass II remained serviceable during a prolonged period of heating in strong acids, which glass I could not endure, as it developed extremely large values of A (the immersion shock), even up to 1 volt at room temperature, a phenomenon which is evidenced in practice by extreme sensitivity of the electrode to disturbing factors, such as slight motion of the air, convection currents in the liquid medium, vibration or other mechanical motion of the apparatus, or proximity of moving bodies, any of which will cause the pH indicator to show large and erratic fluctuations that render impossible accurate measurement of pH. Additionally, glass II remained serviceable during a period of prolonged immersion in hot water and to a substantially greater extent than glass I.

Further, glass II always showed distinct superiority over glass III when tested after prolonged immersion in boiling water or acid. Glass III, after boiling in acid or water, usually shows larger buffer shock, asymmetry drift, acid and alkaline error, and immersion shock and drift, as compared with glass II.

In addition, less lithium was dissolved from the membrane of glass II by boiling acid than from membranes formed of glass I or glass III. This may account in part for the better "utility number" of glass II.

A point of particular interest is the behavior of these electrodes in strong alkali inasmuch as glasses of these three compositions were primarily designed to retain low sodium ion error under adverse conditions. After boiling in the various media mentioned above, the following properties were shown by the three types of glass, tested at room temperature in 1-N NaOH:

| Glass | Av. pH error | Mean deviation, in percent of the av. pH error | Av. drift, $A \cdot 2^{-1/T}$ |
|---|---|---|---|
| I | .27 | 55 | 41 |
| II | .34 | 35 | 24 |
| III | .60 | 35 | 33 |

Thus, although its sodium ion error (second column above) is slightly greater, on the average, than that of glass I, the error of glass II is decidedly more reproducible (see third column), and is considerably less than that of glass III. Moreover, the drift between the first minute and equilibrium in millivolts (fourth column) is less for glass II than for either of the other two glasses.

We have found that lithia glasses containing La and Ce are much superior to lithia glasses containing La and Cs. For example, comparison of glass II with a glass of a composition, in terms of atoms/100 atoms Si, of: Li—79.4; Ca—3.2; Ba—7.9; La—9.5; Cs—6.4, shows that both glasses have comparable resistivities, and age in boiling acid to about the same extent. However, in boiling alkali glass II retains its utility while the La-Cs glass loses its pH response until rejuvenated by soaking in acid, rendering the latter glass of no use for continuous operation in hot alkalies. Omission of both Ce and Cs, as in glass I, results in loss of utility on continuous immersion in boiling acids unless the electrode is rejuvenated by soaking in cold acid.

Within our compositional ranges, we find that glasses of even better durability in hot acids can be produced by increasing both the La and Ce content. For example, if the amount of La is increased from 8 atoms/100 atoms of Si, as in glass II, to about 10 atoms/100 atoms of Si, and the amount of Ce increased from 7 to about 10 atoms/100 atoms of Si, the resulting glass has a better durability in hot acids than any other glass we have tested. However, such a glass is not as good for use in boiling alkali as is glass II, but remains superior to the La-Cs glass above during the first few days of boiling in 1-N NaOH.

The results from glasses containing the two rare earth metals La and Ce are not to be expected. Anyone acquainted with the rare earths and cognizant of their similarity would be inclined to suppose that no mixture of rare earths should exhibit properties other than those to be deduced by linear interpolation between the corresponding properties of the singly-used rare earths. It was at first thought that electrode properties improve with the basicity of the rare earth used, wherefore La would be best and Ce, Pr, Nd, etc. would be inferior, in decreasing order. Indeed, this is suggested by recent literature describing electrode glasses containing Li, La, etc., which presents data teaching that lithia glasses containing Ce as the rare earth are decidedly inferior to lithia glasses containing La as the rare earth, for the purpose of making durable low-error glass electrodes. It has not previously been suspected that lithia glasses containing La and Ce could possibly be better than glasses containing only La or Ce in the same atomic proportion, as the rare earth component.

Various changes and modifications can be made without departing from the spirit of the invention and will be apparent to those skilled in the art from the examples herein given.

We claim as our invention:

1. A glass electrode having a pH-sensitive lithia-silica glass membrane of an oxide-glass composition consisting essentially of: Li in an amount about 50–120 atoms/100 atoms of Si; total alkaline earth metals in an amount about 0–20 atoms/100 atoms of Si; and both La and Ce in a total amount from a few to about 30 atoms/100 atoms of Si, the atomic ratio of the amounts of La and Ce in either order being a maximum of about 10.

2. A glass electrode as defined in claim 1 in which the alkaline earth metal is at least one of the materials selected from the group consisting of Ba, Ca, and Sr.

3. A glass electrode as defined in claim 2 in which the La and Ce are present in approximately equal atomic amounts.

4. A glass electrode as defined in claim 2 in which the amount of La is about 8–10 atoms/100 atoms of Si and the amount of Ce is about 7–10 atoms/100 atoms of Si.

5. A glass electrode having a pH-sensitive lithia-silica glass membrane of an oxide-glass composition consisting essentially of: Li in an amount about 50–120 atoms/100 atoms of Si; Cs in an amount about 0–20 atoms/100 atoms of Si, the total atoms of Li and Cs not exceeding 120 atoms/100 atoms of Si; an alkaline earth metal component in a total amount about 0–20 atoms/100 atoms of Si and being at least one of the alkaline earth metals selected from the group consisting of Ba, Ca and Sr; and a rare earth component in an amount from a few to about 30 atoms/100 atoms of Si and comprising both La and Ce, the atomic ratio of the amounts of La and Ce in either order being a maximum of about 10.

6. A glass electrode as defined in claim 5 in which the La and Ce are present in approximately equal atomic amounts.

7. An electrode glass which results from melting a mixture of a composition, in parts by weight, consisting essentially of about 181 parts $Li_2CO_3$, about 138 parts $BaCO_3$, about 81 parts $La_2O_3$, about 77 parts $CeO_2$ and about 369 parts $SiO_2$.

PAUL T. GILBERT, Jr.
EDWIN P. ARTHUR.

References Cited in the file of this patent

UNITED STATES PATENTS

| Number | Name | Date |
| --- | --- | --- |
| 2,444,845 | Perley | July 6, 1948 |
| 2,462,843 | Carey et al. | Mar. 1, 1949 |
| 2,497,235 | Perley | Feb. 14, 1950 |